July 30, 1940.                    C. H. SUTHERLAND                    2,209,362
                    END BELL COVER FOR DYNAMO-ELECTRIC MACHINES
                              Filed March 21, 1939

WITNESSES:
Edward Michaels
Nw. C. Groome

INVENTOR
Carl H. Sutherland.
BY O.D. Buchanan
ATTORNEY

Patented July 30, 1940

2,209,362

UNITED STATES PATENT OFFICE 2,209,362

END-BELL COVER FOR DYNAMO-ELECTRIC MACHINES

Carl H. Sutherland, Wilkinsburg, Pa., assignor to Westinghouse Electric & Manufacturing Company, East Pittsburgh, Pa., a corporation of Pennsylvania Application March 21, 1939, Serial No. 263,166

2 Claims. (Cl. 171—252)

My present invention relates to the construction of a removable end-bell cover for auxiliary power sets for use on aircraft where particularly exacting requirements are encountered in the matter of reducing weight to an absolute minimum, and in the matter of guarding against difficulties due to vibration.

The particular object of my invention is to provide an electric generator or other dynamo-electric machine with a novel cover-fastening means for closing the end of an end-bell or bracket, in such manner as to occupy a minimum possible space measured along the axis of the dynamo-electric machine, and also to provide a means that will remain secure, free from either rattling or loosening, under severe vibrating conditions.

Figure 1:
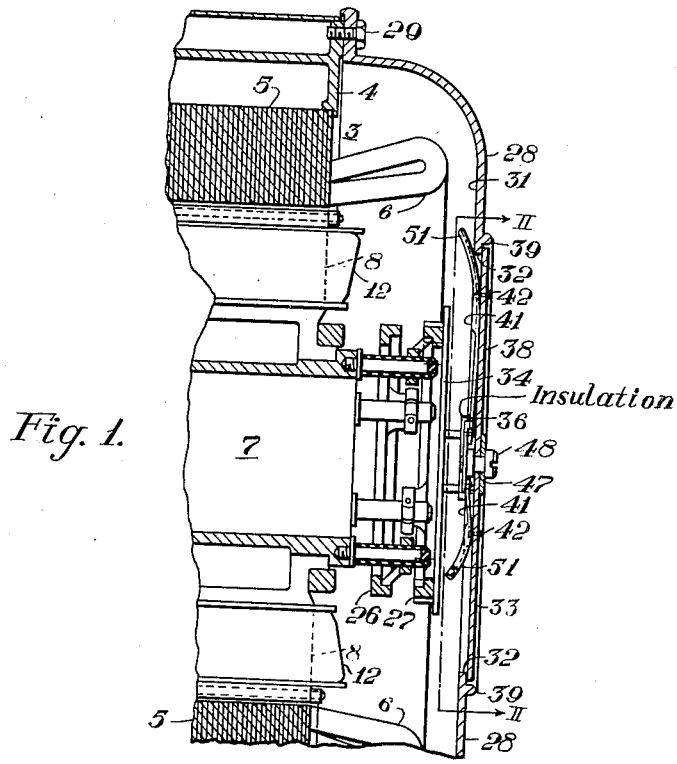
Figure 2:
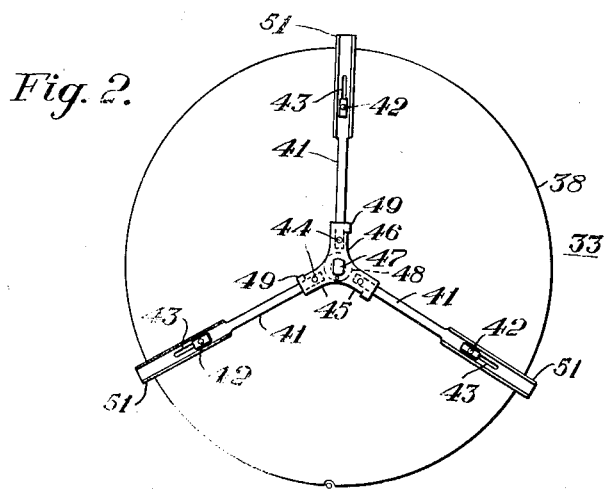

My invention is illustrated, in a preferred form of embodiment, in the accompanying drawing, wherein Figure 1 is a vertical longitudinal sectional view through a dynamo-electric machine embodying my invention; and Fig. 2 is an end view of the inside of the end-bell cover, looking in the direction of the arrows II—II in Fig. 1.

My invention is shown applied to an alternating current generator of moderately high frequency comprising a stator member 3 having a frame 4, a core 5 and alternating-current windings 6, and a rotor member 7 having a plurality of salient poles 8, excited by exciting windings 12 which are energized by means of two cylindrically surfaced current-collecting rings 26 and 27. The precise details of these parts are not essential to my present invention. The details of the rotor-member construction constitute the subject matter of a copending application of Herbert G. Jungk, Serial No. 263,160, filed March 21, 1939, assigned to the Westinghouse Electric & Manufacturing Company. The collector-ring construction and mounting constitute the subject matter of another copending application of H. G. Jungk, Serial No. 263,161, filed March 21, 1939, also assigned to the Westinghouse Electric & Manufacturing Company.

The generator is provided with an end-bell or end-bracket 28 which is secured to the stator frame 4 by any suitable means as indicated at 29. In keeping with the requirements for a minimum weight, the stator frame 4 and the end-bracket 28 are made of a light-weight metal or alloy, and are made physically as small as possible. To this end, the outer end of the bracket 28 is flattened, as indicated at 31, so that the bracket will not be any longer than necessary, in the axial direction. The end-bracket 28 is provided with a large central perforation 32 for providing convenient access to the current-collecting parts. The hole or perforation 32 is normally closed by a removable cover 33 which constitutes the particular subject-matter of my present invention.

As described and claimed in my copending application Serial No. 263,165, filed March 21, 1939, the particular generator which is illustrated in the drawing is provided with brushholder-mountings 34, one for each of the collector-rings 26 and 27, each brushholder-mounting being characterized, among other things, by an insulating supporting plate 36 which rests flatly against the inner surface of the flat portion 31 of the end-bracket 28, and which extends inwardly below the periphery of the large perforation 32 in the end-bracket. It will thus be seen that the available space, for securing the end-bell cover 33 in place, is strictly limited in the direction measured along the axis of the rotor member, and it is an important object of my present invention to provide a cover-securing means which can be effectively utilized in this restricted space.

In accordance with my invention, I provide a cover-plate 38 of a size and shape to just cover the end-bracket opening 32, said cover-plate being seated on the outside of said opening and overlapping the same by a convenient margin. The cover-plate is preferably centered, or prevented from slipping sideways, with respect to said opening 32, by means of suitable centering means on either the cover-plate 38 or the end-bracket 28, the centering means being illustrated in the form of a small annular flange 39 on the end-bracket.

On the inner surface of the cover-plate 38, I provide a plurality of locking fingers 41 which are movable outwardly and inwardly in directions which are approximately radial, so as to engage and disengage with the inner or back surface of the end-bracket 28 around the perforation 32, so as to either hold the cover-plate 38 in place, or to permit it to be removed from the end-bracket 28 for the purpose of obtaining access to the current-collecting equipment.

Each of the fingers 41 is loosely secured against the inner surface of the cover-plate 38 by means of a rivet 42 which is carried by the cover-plate and which extends loosely through an elongated slot 43 in an intermediate portion of the finger 41. The inner ends of the fingers 41 are respectively pivoted, as at 44, to short legs 45 of a centrally disposed star member 46, which is fixedly mounted on a short shaft 47 which extends through the cover-plate 38 and is actuatable, from the outer side of the cover-plate 38, by means of a screw-head 48, whereby the star member 46 may be rotated through a small arc.

It will be noted that the fingers 41 are secured, in toggle fashion, to the short arms 45 of the star plate 46. In the position of the parts which is shown in Fig. 2, the toggle connection has been moved slightly past its dead center, so that the fingers 41 are thrust outwardly only very slightly less than the maximum possible outward thrust which may be given to the said fingers by the rotation of the star member 46. Suitable stops may be provided, as indicated at 49, for limiting the rotating movement of the star plate 46 after the toggle connections have passed slightly beyond dead center, as illustrated in Fig. 2.

When the star plate 46 is rotated in a direction to break the toggle connections, the fingers 41 are drawn approximately radially inwardly so as to release said fingers from engagement with the inside of the end-bracket 28, thus permitting the cover-plate 38 to be very easily removed.

It will be noted, from Fig. 1, that the outer or locking ends of the locking fingers 41 terminate in inclined surfaces 51, which, in the extended position of the fingers 41, engage the inner rim of the opening 32 at an angle. Furthermore, the fingers 41 are made of light sheet-metal which has a certain amount of resiliency which is utilized to cooperate with the inclination 51 of the end-portions of the fingers, to hold the cover-plate 38 securely in position when the star plate 46 has been rotated as far as will be permitted by the stops 49. In this position of the parts, since the toggle connections have been moved slightly beyond their dead centers, before engagement with the stop-means 49, the fingers 41 will have been withdrawn very slightly, in an approximately radial direction, after having been thrust out radially to their maximum extent.

I utilize the resiliency of the fingers, in cooperation with the inclined surfaces 51, to produce a yieldable force-component tending to push the toggle connections further away from their dead centers, so as to keep the star plate 46 rotated tightly against the stop-means 49, thus preventing the possibility of the toggle-connection becoming accidentally "broken," which would result in the falling off of the end-bell cover 33 or 38. I also utilize the inclined surface 51, in cooperation with the yielding or resiliency of the material of the fingers 41, to provide as easily directed force-component pressing against the inner surface of the end-bracket 28, so as to draw the cover-plate 38 constantly toward the front or outer surface of the end-bracket 28, thus preventing vibration or rattling of the cover-plate 38.

While I have described and illustrated my invention in connection with a single preferred form of embodiment, it will be understood that various changes and modifications may be made by those skilled in the art without departing from the essential spirit of my invention. I desire, therefore, that the appended claims shall be accorded the broadest construction consistent with their language and the prior art.

I claim as my invention:

1. A removable end-bell cover for a dynamo-electric machine having a limited axial extent and having an end-bracket with a substantially flat end-surface with a large central perforation, said end-bracket having an outwardly facing seat peripherally surrounding said perforation, said removable end-bell cover comprising a cover-plate of a size and shape to engage said seat, a plurality of locking fingers movably secured on, and close to, the inner surface of said cover-plate, a central star member rotatably secured on the inside of said cover-plate and having as many short radially extending legs as there are locking fingers, means for pivotally connecting the inner end of each locking finger to a different one of the legs of the central star member, means for, in effect, slidably pivoting an intermediate portion of each locking finger to the end-bell cover-plate, means engageable from the outside of the cover-plate for rotating the central star member between the limits of a position in which the locking fingers are withdrawn approximately radially inwardly and a position in which they are extended approximately radially outwardly, toggle fashion, with the star-member pivots somewhat past dead center in the extended position of the locking fingers, and stop-means for limiting the rotation of the central star member in the finger-extending movement thereof, said locking fingers being in locking relation to the inside of the end-bracket when in their extended positions.

2. The invention as defined in claim 1, characterized by said locking fingers having locking ends terminating in inclined surfaces which are yieldably pressed against the end-bracket in the locking position of the fingers, so as to simultaneously press the cover-plate back against its seat on the outer surface of the end-bracket, and to press the inner moving parts against said stop-means for holding the toggle connections past dead center.

CARL H. SUTHERLAND.